United States Patent
Fu et al.

(10) Patent No.: US 12,192,382 B2
(45) Date of Patent: Jan. 7, 2025

(54) METHOD FOR SESSION CREATION AND RELATED EQUIPMENT

(71) Applicant: BEIJING UNISOC COMMUNICATIONS TECHNOLOGY CO., LTD., Beijing (CN)

(72) Inventors: Zhiwei Fu, Beijing (CN); Yifan Bai, Beijing (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 300 days.

(21) Appl. No.: 17/801,026

(22) PCT Filed: Apr. 26, 2020

(86) PCT No.: PCT/CN2020/087044
§ 371 (c)(1),
(2) Date: Aug. 19, 2022

(87) PCT Pub. No.: WO2021/164125
PCT Pub. Date: Aug. 26, 2021

(65) Prior Publication Data
US 2023/0099322 A1 Mar. 30, 2023

(30) Foreign Application Priority Data
Feb. 21, 2020 (CN) .......................... 202010110499.7

(51) Int. Cl.
*H04L 29/06* (2006.01)
*H04L 9/32* (2006.01)
*H04L 67/141* (2022.01)

(52) U.S. Cl.
CPC .......... *H04L 9/3268* (2013.01); *H04L 9/3247* (2013.01); *H04L 67/141* (2013.01)

(58) Field of Classification Search
CPC ... H04L 9/3268; H04L 9/3247; H04L 67/141; H04L 63/0823; H04L 2209/80;
(Continued)

(56) References Cited

U.S. PATENT DOCUMENTS

2014/0298420 A1 10/2014 Barton et al.
2016/0277927 A1* 9/2016 Lee .......................... H04L 67/51
(Continued)

FOREIGN PATENT DOCUMENTS

CN 101980232 A 2/2011
CN 104778393 A 7/2015
(Continued)

OTHER PUBLICATIONS

The first office action issued in corresponding CN application No. 202010110499.7 dated Oct. 10, 2020.
(Continued)

*Primary Examiner* — William A Corum, Jr.
(74) *Attorney, Agent, or Firm* — HAUPTMAN HAM, LLP

(57) ABSTRACT

A method for session creation is provided. The method includes: acquiring a signing certificate of a first application or a digital fingerprint of the signing certificate when performing network connection; matching the signing certificate of the first application or the digital fingerprint of the signing certificate with application descriptors in a UE route selection policy (URSP) rule distributed by a network side; and creating a session for the first application.

20 Claims, 5 Drawing Sheets

Acquire, by a user equipment (UE), a signing certificate of a first application or a digital fingerprint of the signing certificate, when performing network connection — S200

Match, by the UE, the signing certificate of the first application or the digital fingerprint of the signing certificate with application descriptors in a UE route selection policy (URSP) rule distributed by a network side, and create, by the UE, a session for the first application — S201

(58) Field of Classification Search
CPC . H04L 9/0643; H04L 9/3263; H04L 63/0876; H04L 69/164; G06F 21/44; G06F 21/51; H04W 12/48; H04W 76/12; H04W 12/069; H04W 12/79

See application file for complete search history.

(56) References Cited

U.S. PATENT DOCUMENTS

| | | |
|---|---|---|
| 2019/0394279 A1 | 12/2019 | Dao et al. |
| 2020/0053622 A1* | 2/2020 | Huang-Fu ............. H04W 76/22 |
| 2020/0092380 A1* | 3/2020 | Lee ....................... H04W 76/10 |
| 2021/0194970 A1* | 6/2021 | Li ........................... H04L 45/00 |
| 2023/0077340 A1* | 3/2023 | Han ....................... H04L 67/51 709/224 |

FOREIGN PATENT DOCUMENTS

| | | |
|---|---|---|
| CN | 109286587 A | 1/2019 |
| CN | 110149670 A | 8/2019 |
| CN | 110166577 A | 8/2019 |
| CN | 110474840 A | 11/2019 |
| EP | 2824963 A4 | 12/2015 |
| WO | 2019028837 A1 | 2/2019 |
| WO | 2020030180 A1 | 2/2020 |

OTHER PUBLICATIONS

Notice of allowance issued in corresponding CN application No. 202010110499.7 dated Mar. 31, 2021.
ZTE, Clarification on Policy Control Request Triggers 3GPP TSG-SA WG2 Meeting #136 S2-1911398, Nov. 22, 2019.
WIPO, International Search Report and Written Opinion for International Application No. PCT/CN2020/087044, Nov. 26, 2020.
Ericsson: "Clarifications on the OSId and Appld in the URSP rule", 3GPP Draft; S2-2002033, Feb. 18, 2020.
Huawei et al: "Correction for URSP rule parameter traffic descriptor", 3GPP Draft; S2-1813112, Dec. 4, 2018.
The extended European search report issued in corresponding EP application No. 20920074.0 dated Jun. 29, 2023.

* cited by examiner

METHOD FOR SESSION CREATION AND RELATED EQUIPMENT

CROSS-REFERENCE TO RELATED APPLICATION(S)

This application is a National Stage of International Application No. PCT/CN2020/087044, field Apr. 26, 2020, which claims priority to Chinese Patent Application No. 202010110499.7, filed Feb. 21, 2020, the entire disclosures of which are hereby incorporated by reference.

TECHNICAL FIELD

This application relates to the field of communication technologies, and particularly to a method for session creation and related equipment.

BACKGROUND

In an existing communication system, uplink data is transmitted through session creation. Application descriptors are defined in a Traffic descriptor in a user equipment (UE) route selection policy (URSP) rule of 3rd generation partnership project (3GPP) protocol. Application descriptors can match 5G core (5GC) network configuration. However, existing application descriptors may be tampered with or forged, resulting in confusion in session creation, thereby affecting network reliability.

SUMMARY

A first aspect of implementations of the disclosure provides a method for session creation. The method for session creation is performed by a user equipment (UE) and includes: acquiring a signing certificate of a first application or a digital fingerprint of the signing certificate, when performing network connection; matching the signing certificate of the first application or the digital fingerprint of the signing certificate with application descriptors in a UE route selection policy (URSP) rule distributed by a network side; and creating a session for the first application.

A second aspect of implementations of the disclosure provides a non-transitory computer-readable storage medium. The non-transitory computer-readable storage medium stores computer programs which cause a computer to: acquire a signing certificate of a first application or a digital fingerprint of the signing certificate, when performing network connection; match the signing certificate of the first application or the digital fingerprint of the signing certificate with application descriptors in a URSP rule distributed by a network side; and create a session for the first application.

A third aspect of implementations of the disclosure provides a UE. The UE includes a transceiver, a processor, and a memory. The processor is coupled with the transceiver. The memory is coupled with the transceiver and the processor. The memory stores program codes which are operable with the processor to: cause the transceiver to acquire a signing certificate of a first application or a digital fingerprint of the signing certificate, when the UE performs network connection; match the signing certificate of the first application or the digital fingerprint of the signing certificate with application descriptors in a URSP rule distributed by a network side; and create a session for the first application.

BRIEF DESCRIPTION OF THE DRAWINGS

In order to describe technical solutions of implementations of the disclosure more clearly, the following will give a brief description of accompanying drawings used for describing the implementations. Apparently, accompanying drawings described below are merely some implementations. Those of ordinary skill in the art can also obtain other accompanying drawings based on the accompanying drawings described below without creative efforts.

DETAILED DESCRIPTION

The terms used in implementations of the disclosure are merely used to explain specific implementations of the disclosure, and are not intended to limit the disclosure. The terms "first", "second", "third", "fourth", and the like used in the specification, the claims, and the accompany drawings of the disclosure are used to distinguish different objects rather than to describe a particular order. Furthermore, the terms "include", "comprise", and "have" as well as variations thereof are intended to cover non-exclusive inclusion.

Hereinafter, implementations of the disclosure will be described with reference to accompanying drawings intended for the implementations.

The term "and/or" of the disclosure is merely used to describe an association relationship of associated objects, and indicates that there can be three relationships. For example, "A and/or B" means that: A alone, both A and B, or B alone. In addition, the character "I" herein generally indicates that associated objects before and after the character are in an "or" relationship.

The terms "a plurality of" or "multiple" appearing in implementations of the disclosure means two or more. The descriptions of the "first", "second", etc. appearing in implementations of the disclosure are merely used for illustration and distinguishing described objects, and do not indicate an order, nor do they indicate a special limitation on the number of devices of implementations of the disclosure, which should not constitute any limitation to implementations of the disclosure. The "connection" appearing in implementations of the disclosure refers to various connection modes such as direct connection or indirect connection, to realize communication between devices, which is not limited in implementations of the disclosure.

Figure 1:
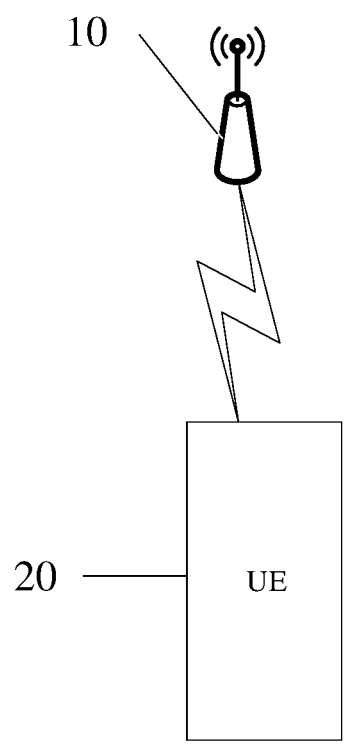
FIG. 1 is a schematic structural diagram illustrating a communication system provided in implementations of the disclosure.

Referring to FIG. 1, FIG. 1 is a schematic structural diagram illustrating a communication system provided in implementations of the disclosure. The communication system includes a base station 10 and a user equipment (UE) 20, where the base station and the UE are in wireless communication connection. The wireless communication connection includes, but is not limited to, long term evolution (LTE) connection, and new radio (NR) connection. In practice, there may also be other connection modes, and the disclosure does not limit the mode of the connection. The base station may be an eNodeB, an NR base station, or an access point (AP), etc.

The terminal in implementations of the disclosure may refer to various forms of UEs, access terminals, subscriber units, subscriber stations, mobile stations (MS), remote stations, remote terminals, and mobile equipment, user terminals, terminal equipment, wireless communication equipment, user agents, or user devices. The terminal equipment may also be a cellular telephone, a cordless telephone, a session initiation protocol (SIP) telephone, a wireless local loop (WLL) station, a personal digital assistant (PDA), a handheld device with a wireless communication function, a computing device, other processing devices coupled with a wireless modem, an in-vehicle device, a wearable device, terminal equipment in a future 5G network or a future evolved public land mobile network (PLMN), etc., which is not limited in implementations of the disclosure.

A 5G core (5GC) network requires a terminal to perform route matching and selection for uplink transmission data according to a UE route selection policy (URSP) rule distributed by a network. According to the URSP rule, an established protocol data unit (PDU) session can be multiplexed, or a new PDU session can be established. Application descriptors are defined in a Traffic descriptor of the URSP rule of 3rd generation partnership project (3GPP) protocol, and the terminal matches an uplink data route through an application identifier according to the URSP rule distributed by the network. Application identifiers in the URSP rule can be used by a network operator to provide differentiated quality of service (QoS) for different applications, thereby generating differentiated traffic control policies or payment services. The 3GPP protocol defines a URSP rule and optional application descriptors, but does not specify how to allocate and obtain an application identifier (APP ID), how an operator controls the allocated APP ID of an application to match 5GC network configuration, how a terminal obtains an APP ID of an application when evaluating and selecting a URSP rule, and how to prevent an APP ID of an application from being tampered with or forged during application distribution or application installation or in a terminal operating system.

Specifically, for 3GPP network connection, different PDU sessions are created for different applications according to different technical scenarios, and different applications may have different QoS. PDU session creation is based on application descriptors (e.g., APP ID) of an application obtained by a terminal when evaluating and selecting a URSP rule. If the application descriptors of the application are forged or tampered with, confusion in session establishment may occur, which will affect network reliability.

Figure 2:
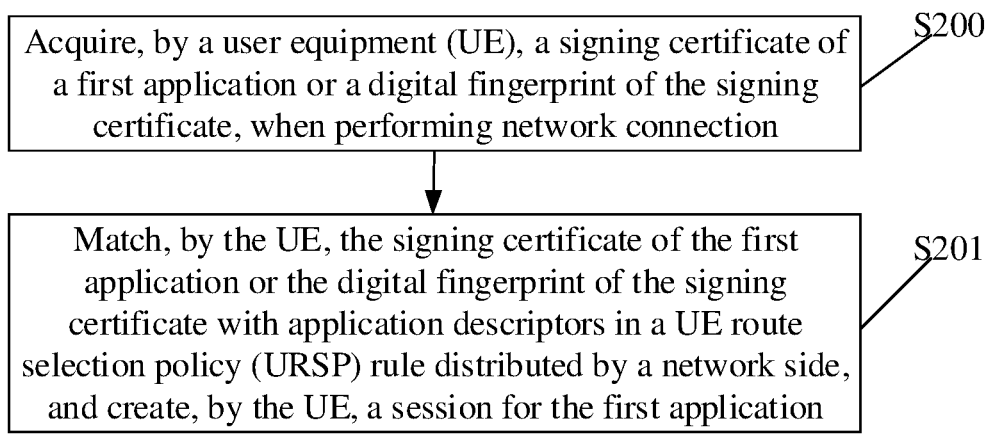
FIG. 2 illustrates a method for session creation provided in implementations of the disclosure.

Referring to FIG. 2, FIG. 2 illustrates a method for session creation provided in implementations of the disclosure. The method is performed in the communication system illustrated in FIG. 1, and the method includes, but is not limited to, the following.

At S200, when performing network connection, UE acquires a signing certificate of a first application or a digital fingerprint of the signing certificate.

Specifically, in an optional implementation, the session is a PDU session.

Application descriptors of the disclosure may be application descriptors defined by a Traffic descriptor in 3GPP protocol.

Specifically, the application descriptors include an operating system identifier (OSId) and an operating system application identifier (OSAppId). In an optional implementation, there are multiple operating system application identifiers, which can also be represented as OSAppId(s).

At S201, the UE matches the signing certificate of the first application or the digital fingerprint of the signing certificate with application descriptors in a URSP rule distributed by a network side, and creates a session for the first application.

Specifically, in an optional implementation, the UE uses "Application descriptors 1" as the application descriptors in the URSP rule for matching, and then creates or multiplexes a PDU session through user route selection.

Specifically, before the operation at S200, the method further includes the following. The UE acquires the first application, where the first application contains the signing certificate of the first application.

In an optional implementation, the UE acquires the first application locally. For example, the UE receives the first application from other devices (including but not limited to a personal computer, other UEs, etc.) in a wired or wireless manner.

In another optional implementation, the UE also acquires the first application through a network. For example, the UE transmits a request message for acquiring the first application to a network equipment, and receives an installation file or an installation package of the first application returned by the network equipment.

Specifically, the method further includes the following. The UE receives the application descriptors in the URSP rule distributed by an operator server.

In implementations of the disclosure, the digital fingerprint of the signing certificate of the first application is a string encrypted by a one-way encryption algorithm. The one-way encryption algorithm includes, but is not limited to, a hash algorithm, an SHA-1 or SHA-256 algorithm, etc.

Specifically, in an optional implementation, on condition that the signing certificate of the first application or the digital fingerprint of the signing certificate is consistent with the application descriptors, determine that the signing certificate of the first application or the digital fingerprint of the signing certificate matches the application descriptors. On condition that the signing certificate of the first application or the digital fingerprint of the signing certificate is different from the application descriptors, determine that the signing certificate of the first application or the digital fingerprint of the signing certificate fails to match the application descriptors.

According to technical solutions of the disclosure, the signing certificate of the first application or the digital fingerprint of the signing certificate is read when creating a session, the UE matches the signing certificate of the first application or the digital fingerprint of the signing certificate with the application descriptors in the URSP rule distributed by the network side, and the UE creates the session for the first application. The application descriptors are managed by an operator, so that the application descriptors are prevented from being tampered with by other applications or programs, which can ensure security of the application descriptors and ensure network stability. Moreover, the technical solutions of the disclosure do not depend on hardware. An application developer can register with the operator, and the operator can manage and control a signing certificate of an application as application descriptors, which can realize authorization management of the application by the operator, and provide users with differentiated value-added services and technical support. Implementation complexity of a terminal system is relatively low, and the existing certificate signing mechanism of a smart device can be used directly. A risk of tampering or forgery of the application descriptors can be eliminated at application distribution and installation stages. Before an application uses a data service, application descriptors with authentication guarantee can be realized without accessing a network.

Figure 3:
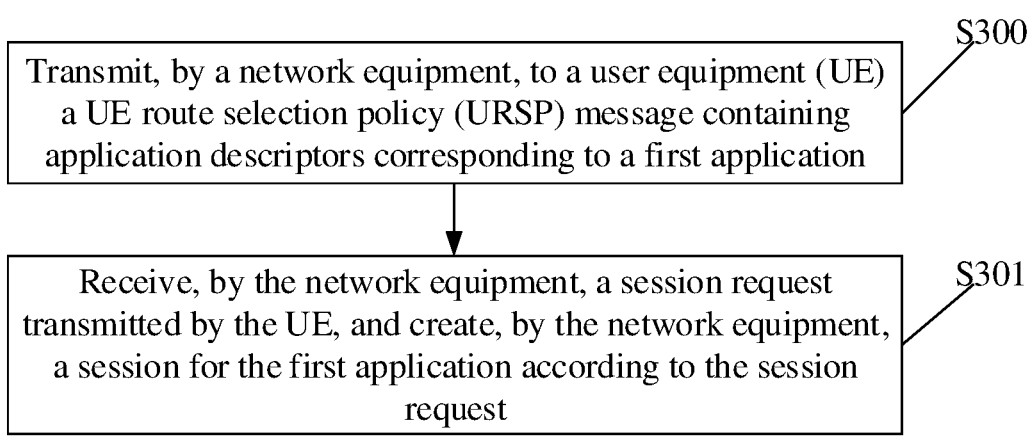
FIG. 3 illustrates a method for session communication provided in implementations of the disclosure.

Referring to FIG. 3, FIG. 3 illustrates a method for session communication. The method is implemented in the communication system illustrated in FIG. 1. The UE illustrated in FIG. 1 may be a UE of an application developer. As illustrated in FIG. 3, the method includes the following.

At S300, a network equipment transmits to a UE a URSP message containing application descriptors corresponding to a first application.

At S301, the network equipment receives a session request transmitted by the UE, and creates a session for the first application according to the session request.

Specifically, in an optional implementation, the network equipment receives a signing certificate of the first application or a digital fingerprint of the signing certificate transmitted by an application development user. The network equipment uses the signing certificate of the first application or the digital fingerprint of the signing certificate as application descriptors in a URSP rule.

Optionally, in an optional implementation, the network equipment receives the first application transmitted by an application development user, where the first application contains a signing certificate of a developer. The network equipment obtains a network signature of the first application by re-signing the first application, where the network signature includes a network signing certificate of the first application or a digital fingerprint of the network signing certificate. The network equipment uses the network signing certificate or the digital fingerprint of the network signing certificate as application descriptors in a URSP rule.

Specifically, in an optional implementation, the network equipment receives a signing certificate of an application developer transmitted by an application development user. The network equipment obtains a re-signed certificate by re-signing the signing certificate. The network equipment transmits the re-signed certificate to the application development user, and indicates the application development user to carry in the first application the re-signed certificate as the signing certificate of the application developer, as application descriptors in a URSP rule.

Specifically, in an optional implementation, the network equipment receives a registration request transmitted by an application development user, where the registration request contains a signing certificate of the first application or a digital fingerprint of the signing certificate. The network equipment registers the signing certificate of the first application or the digital fingerprint of the signing certificate according to the registration request.

The technical solutions of the disclosure can support implementing of the method for session creation illustrated in FIG. 2, which can improve network stability.

Figure 4:
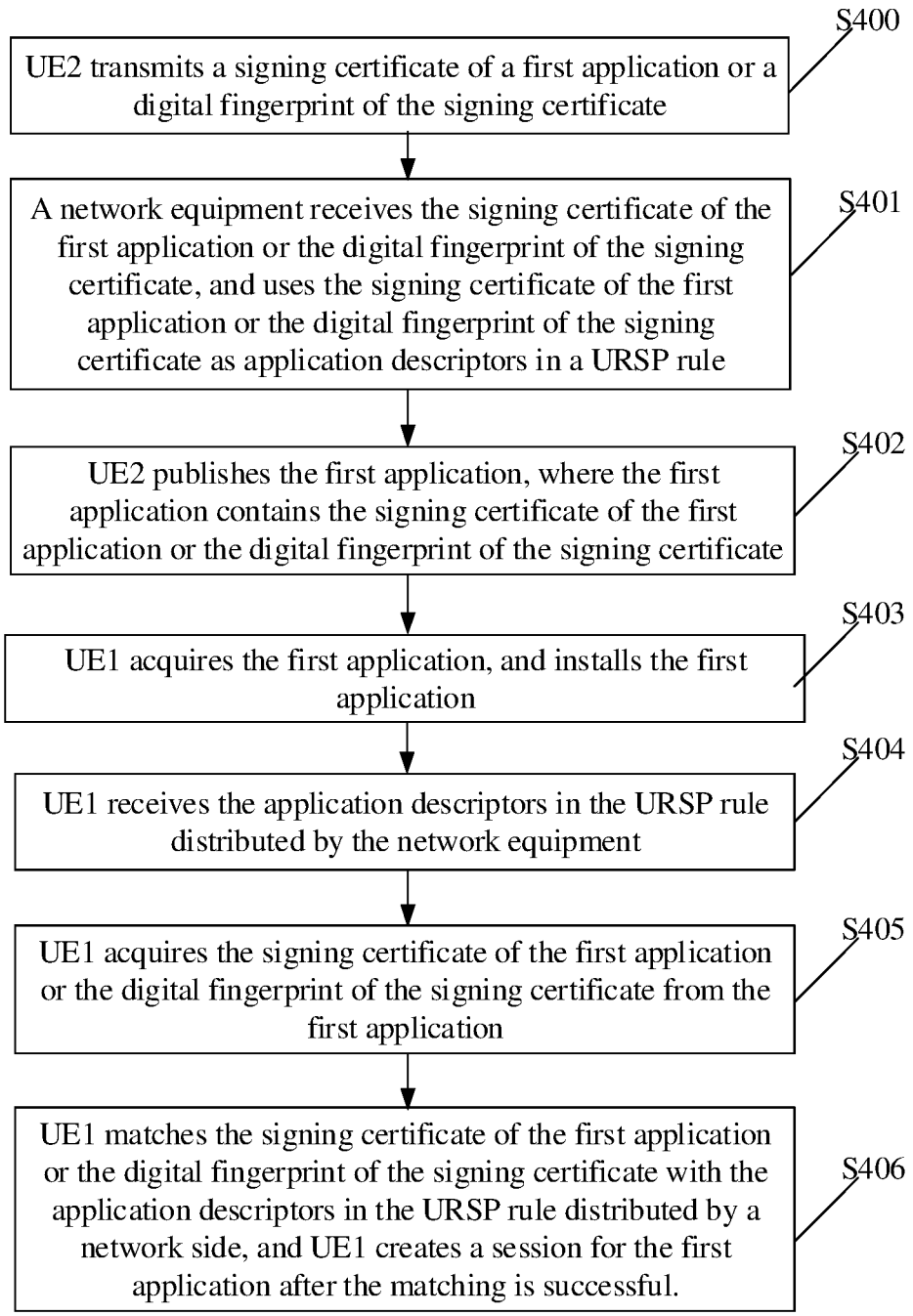
FIG. 4 illustrates a method for session creation provided in implementations of the disclosure.

Referring to FIG. 4, FIG. 4 illustrates a method for session creation provided in implementations of the disclosure. The method is implemented under a network architecture illustrated in FIG. 1. The method involves two UEs. For convenience of description, UE1 and UE2 are depicted to distinguish the two UEs, where UE1 is a UE of a user, and UE2 is a UE of an application developer. Referring to FIG. 4, the method provided in FIG. 4 includes the following.

At S400, UE2 transmits a signing certificate of a first application or a digital fingerprint of the signing certificate.

At S401, a network equipment receives the signing certificate of the first application or the digital fingerprint of the signing certificate, and uses the signing certificate of the first application or the digital fingerprint of the signing certificate as application descriptors in a URSP rule.

At S402, UE2 publishes the first application, where the first application contains the signing certificate of the first application or the digital fingerprint of the signing certificate.

At S403, UE1 acquires the first application, and installs the first application.

At S404, UE1 receives the application descriptors in the URSP rule distributed by the network equipment.

At S405, UE1 acquires the signing certificate of the first application or the digital fingerprint of the signing certificate from the first application.

At S406, UE1 matches the signing certificate of the first application or the digital fingerprint of the signing certificate with the application descriptors in the URSP rule distributed by a network side, and after the matching is successful, UE1 creates a session for the first application.

According to technical solutions of the disclosure, the signing certificate of the first application or the digital fingerprint of the signing certificate is read when creating a session, the UE matches the signing certificate of the first application or the digital fingerprint of the signing certificate with the application descriptors in the URSP rule distributed by the network side, and the UE creates the session for the first application. The application descriptors are managed by an operator, so that the application descriptors are prevented from being tampered with by other applications or programs, which can ensure security of the application descriptors and ensure network stability. Moreover, the technical solutions of the disclosure do not depend on hardware. An application developer can register with the operator, and the operator can manage and control a signing certificate of an application as application descriptors, which can realize authorization management of the application by the operator, and provide users with differentiated value-added services and technical support. Implementation complexity of a terminal system is relatively low, and the existing certificate signing mechanism of a smart device can be used directly. A risk of tampering or forgery of the application descriptors can be eliminated at application distribution and installation stages. Before an application uses a data service, application descriptors with authentication guarantee can be realized without accessing a network.

Specifically, in an optional implementation, the operation at S401 of the implementations illustrated in FIG. 4 may be replaced by the following. At S401-1, the network equipment obtains a network signature of the first application by re-signing the first application, where the network signature includes a network signing certificate of the first application or a digital fingerprint of the network signing certificate; and uses the network signing certificate or the digital fingerprint of the network signing certificate as application descriptors in a URSP rule.

Specifically, in another optional implementation, the operations at S400 and S401 of the implementations illustrated in FIG. 4 may be replaced by the following. At S400-2, the network equipment receives a signing certificate of an application developer transmitted by an application development user. At S401-2, the network equipment obtains a re-signed certificate by re-signing the signing certificate; transmits the re-signed certificate to the application development user; and indicates the application development user to carry in the first application the re-signed certificate as the signing certificate of the application developer, as application descriptors in a URSP rule.

According to the above technical solution, the application development user is signed, so that a signature of the application development user will not change as long as the application development user does not change, which can avoid performing signing and authentication multiple times when multiple applications are developed by a same development user.

Figure 5:
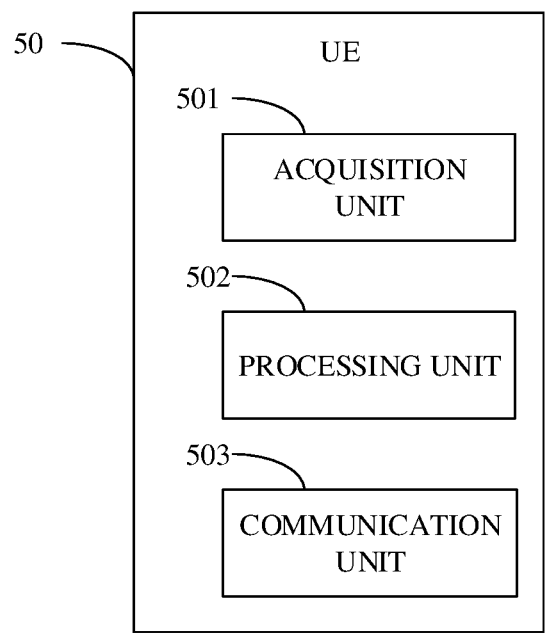
FIG. 5 is a schematic structural diagram illustrating a user equipment provided in implementations of the disclosure.

Referring to FIG. 5, FIG. 5 illustrates a UE 50. The UE includes an acquisition unit 501 and a processing unit 502. The acquisition unit 501 is configured to acquire a signing certificate of a first application or a digital fingerprint of the signing certificate when performing network connection. The processing unit 502 is configured to match the signing certificate of the first application or the digital fingerprint of the signing certificate with application descriptors in a URSP rule distributed by a network side, and create a session for the first application.

Specifically, in an optional implementation, the session is a PDU session.

Specifically, in an optional implementation, the application descriptors are application descriptors defined by a Traffic descriptor in 3GPP protocol.

Specifically, in an optional implementation, the application descriptors include an OSId and an OSAppId.

Specifically, in an optional implementation, the UE further includes a communication unit 503. The communication unit 503 is configured to receive the first application distributed, where the first application contains the signing certificate of the first application.

Specifically, in an optional implementation, the digital fingerprint of the signing certificate of the first application is a string encrypted by a one-way encryption algorithm.

Specifically, in an optional implementation, the communication unit 503 is further configured to receive the application descriptors in the URSP rule distributed by an operator server.

Specifically, in an optional implementation, the processing unit 502 is specifically configured to: determine that the signing certificate of the first application or the digital fingerprint of the signing certificate matches the application descriptors, on condition that the signing certificate of the first application or the digital fingerprint of the signing certificate is consistent with the application descriptors; or determine that the signing certificate of the first application or the digital fingerprint of the signing certificate fails to match the application descriptors, on condition that the signing certificate of the first application or the digital fingerprint of the signing certificate is different from the application descriptors.

According to technical solutions of the disclosure, the signing certificate of the first application or the digital fingerprint of the signing certificate is read when creating a session, the UE matches the signing certificate of the first application or the digital fingerprint of the signing certificate with the application descriptors in the URSP rule distributed by the network side, and the UE creates the session for the first application. The application descriptors are managed by an operator, so that the application descriptors are prevented from being tampered with by other applications or programs, which can ensure security of the application descriptors and ensure network stability. Moreover, the technical solutions of the disclosure do not depend on hardware. An application developer can register with the operator, and the operator can manage and control a signing certificate of an application as application descriptors, which can realize authorization management of the application by the operator, and provide users with differentiated value-added services and technical support. Implementation complexity of a terminal system is relatively low, and the existing certificate signing mechanism of a smart device can be used directly. A risk of tampering or forgery of the application descriptors can be eliminated at application distribution and installation stages. Before an application uses a data service, application descriptors with authentication guarantee can be realized without accessing a network.

Figure 6:
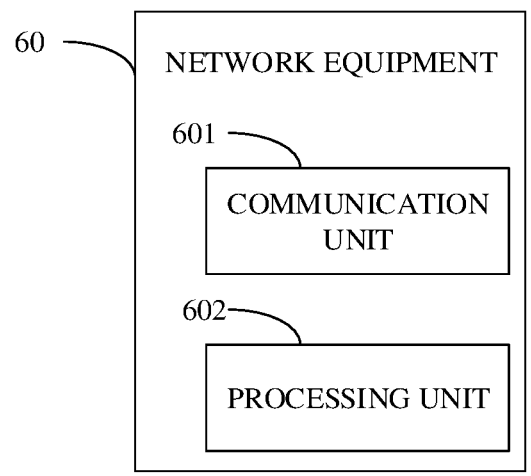
FIG. 6 is a schematic structural diagram illustrating a network equipment provided in implementations of the disclosure.

Referring to FIG. 6, FIG. 6 illustrates a network equipment 60. The network equipment includes a communication unit 601 and a processing unit 602. The communication unit 601 is configured to transmit to a UE a URSP message containing application descriptors corresponding to a first application, and receive a session request transmitted by the UE. The processing unit 602 is configured to create a session for the first application according to the session request.

Specifically, in an optional implementation, the communication unit 601 is further configured to receive a signing certificate of the first application or a digital fingerprint of the signing certificate transmitted by an application development user. The processing unit 602 is further configured to use the signing certificate of the first application or the digital fingerprint of the signing certificate as application descriptors in a URSP rule.

Specifically, in an optional implementation, the communication unit 601 is further configured to receive the first application transmitted by an application development user, where the first application contains a signing certificate of a developer. The processing unit 602 is further configured to obtain a network signature of the first application by re-signing the first application, where the network signature includes a network signing certificate of the first application or a digital fingerprint of the network signing certificate; and use the network signing certificate or the digital fingerprint of the network signing certificate as application descriptors in a URSP rule.

Specifically, in an optional implementation, the communication unit 601 is further configured to receive a signing certificate of an application developer transmitted by an application development user. The processing unit 602 is further configured to obtain a re-signed certificate by re-signing the signing certificate; transmit the re-signed certificate to the application development user; and indicate the application development user to carry in the first application the re-signed certificate as the signing certificate of the application developer, as application descriptors in a URSP rule.

Specifically, in an optional implementation, the communication unit 601 is further configured to receive a registration request transmitted by an application development user, where the registration request contains a signing certificate of the first application or a digital fingerprint of the signing certificate. The processing unit 602 is further configured to register the signing certificate of the first application or the digital fingerprint of the signing certificate according to the registration request.

Figure 7:
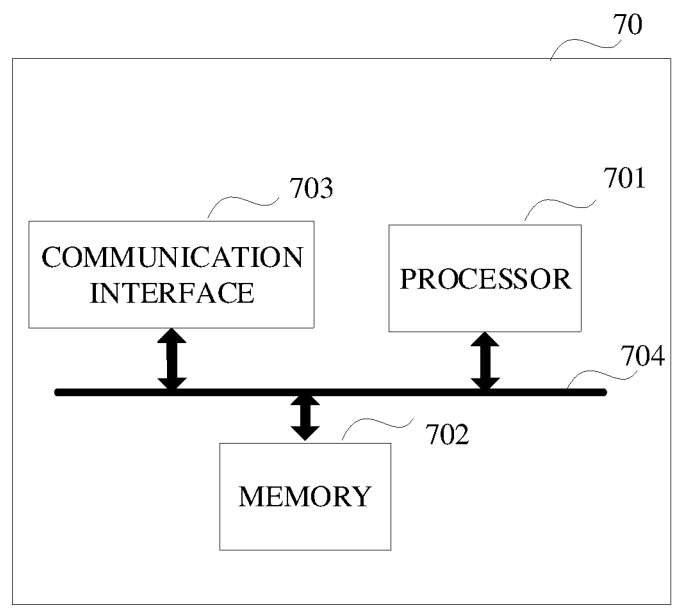
FIG. 7 is a schematic structural diagram illustrating an equipment provided in implementations of the disclosure.

Referring to FIG. 7, FIG. 7 illustrates an equipment 70 provided in implementations of the disclosure. The equipment 70 includes a processor 701, a memory 702, and a communication interface 703. The processor 701, the memory 702, and the communication interface 703 are connected to each other via a bus 704.

The memory 702 includes, but is not limited to, a random access memory (RAM), a read-only memory (ROM), an erasable programmable ROM (EPROM), or a compact disc ROM (CD-ROM), etc. The memory 702 is configured to store related computer programs and data. The communication interface 703 is configured to receive and transmit data.

The processor 701 may be one or more central processing units (CPU). If the processor 701 is a CPU, the CPU may be a single-core CPU or a multi-core CPU.

The processor 701 of the equipment 70 is configured to read computer program codes stored in the memory 702 to perform: acquiring a signing certificate of a first application or a digital fingerprint of the signing certificate, when performing network connection; matching the signing certificate of the first application or the digital fingerprint of the signing certificate with application descriptors in a URSP rule distributed by a network side; and creating a session for the first application.

It should be noted that, for details of implementation of each of the above operations, reference can also be made to corresponding descriptions of the method implementations illustrated in FIG. 2, FIG. 3, and FIG. 4.

Implementations of the disclosure further provide a chip system. The chip system includes at least one processor, a memory, and an interface circuit. The memory, a transceiver, and the at least one processor are interconnected through a line. The memory stores computer programs which, when executed by the processor, are operable to execute method flows illustrated in FIG. 2, FIG. 3, and FIG. 4.

Implementations of the disclosure further provide a non-transitory computer-readable storage medium. The non-transitory computer-readable storage medium stores computer programs which, when run on a network equipment, are operable to execute method flows illustrated in FIG. 2, FIG. 3, and FIG. 4.

Implementations of the disclosure further provide a computer program product which, when run on a terminal, is operable to execute method flows illustrated in FIG. 2, FIG. 3, and FIG. 4.

Implementations of the disclosure further provide a terminal. The terminal includes a processor, a memory, a communication interface, and one or more programs. The one or more programs are stored in the memory and configured to be executed by the processor. The programs include instructions which are operable to execute the operations of the method of implementations illustrated in FIG. 2, FIG. 3, and FIG. 4.

The foregoing technical solutions of the implementations of the disclosure are mainly described from the viewpoint of execution of the method. It can be understood that, in order to implement the above functions, the electronic equipment includes hardware structures and/or software modules corresponding to the respective functions. Those skilled in the art should readily recognize that, in combination with the exemplary units and scheme steps or operations described in the implementations disclosed herein, the disclosure can be implemented in hardware or a combination of hardware and computer software. Whether a function is implemented by way of hardware or computer software driving hardware depends on the particular application and design constraints of the technical solution. Those skilled in the art may use different methods to implement the described functions for each particular application, but such implementation should not be considered as beyond the scope of the disclosure.

According to the implementations of the disclosure, functional units may be divided for the electronic equipment in accordance with the foregoing method examples. For example, functional units may be divided according to corresponding functions, and two or more functions may be integrated into one processing unit. The above-mentioned integrated unit can be implemented in the form of hardware or software functional units. It should be noted that the division of units in the implementations of the disclosure is schematic and is merely a logical function division; there may be other division manners in actual implementation.

Implementations of the disclosure further provide a computer storage medium. The computer storage medium stores computer programs for electronic data interchange. The computer programs cause a computer to execute all or part of the operations of any method described in the foregoing method implementations. The computer includes an electronic equipment.

Implementations of the disclosure further provide a computer program product. The computer program product includes a non-transitory computer-readable storage medium storing computer programs. The computer programs are operable with a computer to execute all or part of the operations of any method described in the foregoing method implementations. The computer program product may be a software installation package, and the computer includes an electronic equipment.

It is to be noted that, for the sake of simplicity, the foregoing method implementations are described as a series of action combinations, however, it will be appreciated by those skilled in the art that the disclosure is not limited by the sequence of actions described. That is because that, according to the disclosure, certain steps or operations may be performed in other order or simultaneously. Besides, it will be appreciated by those skilled in the art that the implementations described in the specification are exemplary implementations and the actions and modules involved are not necessarily essential to the disclosure.

In the foregoing implementations, the description of each implementation has its own emphasis. For the parts not described in detail in one implementation, reference may be made to related descriptions in other implementations.

In the implementations of the disclosure, it should be understood that, the device/equipment disclosed in implementations provided herein may be implemented in other manners. For example, the equipment implementations described above are merely illustrative; for instance, the division of the unit is only a logical function division and there can be other manners of division during actual implementations, for example, multiple units or assemblies may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product.

Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network equipment and so on) to perform all or part of the operations of the method described in the various implementations of the disclosure. The memory includes various medium capable of storing program codes, such as a universal serial bus (USB), a ROM, a RAM, a removable hard disk, disk, CD, or the like.

It will be understood by those of ordinary skill in the art that all or part of the operations of various methods of the implementations described above may be accomplished by means of a program to instruct associated hardware, and the program may be stored in a computer-readable memory. The memory may include a flash memory, a ROM, a RAM, disk or CD, and so on.

Implementations of the disclosure provide a method for session creation, which can achieve effective management of application descriptors, implement session creation, and improve network reliability.

A first aspect of implementations of the disclosure provides a method for session creation. The method for session creation includes: acquiring, by a UE, a signing certificate of a first application or a digital fingerprint of the signing certificate, when performing network connection; and matching, by the UE, the signing certificate of the first application or the digital fingerprint of the signing certificate with application descriptors in a URSP rule distributed by a network side, and creating, by the UE, a session for the first application.

A second aspect of implementations of the disclosure provides a method for session communication. The method for session communication includes: transmitting, by a network equipment, to a UE a URSP message containing application descriptors corresponding to a first application; and receiving, by the network equipment, a session request transmitted by the UE, and creating, by the network equipment, a session for the first application according to the session request.

A third aspect of implementations of the disclosure provides a terminal. The terminal includes a processor, a memory, a communication interface, and one or more programs. The one or more programs are stored in the memory and configured to be executed by the processor. The programs include instructions which are operable to execute the operations of the method of the first aspect or the operations of the method of the second aspect.

A fourth aspect of implementations of the disclosure provides a computer-readable storage medium. The computer-readable storage medium stores computer programs for electronic data interchange. The computer programs are operable with a computer to execute the method of the first aspect or the second aspect.

A fifth aspect of implementations of the disclosure provides a computer program product. The computer program product includes a non-transitory computer-readable storage medium storing computer programs. The computer programs are operable with a computer to execute all or part of the operations of the method described in the first aspect or the second aspect of implementations of the disclosure. The computer program product may be a software installation package.

By implementing technical solutions provided in implementations of the disclosure, the signing certificate of the first application or the digital fingerprint of the signing certificate is read when creating a session, the UE matches the signing certificate of the first application or the digital fingerprint of the signing certificate with the application descriptors in the URSP rule distributed by the network side, and the UE creates the session for the first application. The application descriptors are managed by an operator, so that the application descriptors are prevented from being tampered with by other applications or programs, which can ensure security of the application descriptors and ensure network stability. Moreover, the technical solutions of the disclosure do not depend on hardware. An application developer can register with the operator, and the operator can manage and control a signing certificate of an application as application descriptors, which can realize authorization management of the application by the operator, and provide users with differentiated value-added services and technical support. Implementation complexity of a terminal system is relatively low, and the existing certificate signing mechanism of a smart device can be used directly. A risk of tampering or forgery of the application descriptors can be eliminated at application distribution and installation stages. Before an application uses a data service, application descriptors with authentication guarantee can be realized without accessing a network.

While the principles and implementations of the disclosure have been described in connection with illustrative implementations, it is to be understood that foregoing implementations are merely used to help understand the method and the core idea of the disclosure. As will occur to those skilled in the art, the disclosure is susceptible to various modifications and changes without departing from the spirit and principle of the disclosure. Therefore, contents of the Specification should not be construed as a limitation to the disclosure.

What is claimed is:

1. A method for session creation, performed by a user equipment (UE), comprising:
   acquiring a signing certificate of a first application or a digital fingerprint of the signing certificate, when performing network connection;
   matching the signing certificate of the first application or the digital fingerprint of the signing certificate with application descriptors in a UE route selection policy (URSP) rule distributed by a network side; and
   creating a session for the first application; wherein the first application contains a signing certificate of a developer, the application descriptors in the URSP rule comprise a network signing certificate of the first application or a digital fingerprint of the network signing certificate that is comprised in a network signature of the first application, and the network signature of the first application is obtained by re-signing by the network side the first application.

2. The method of claim 1, wherein the session is a protocol data unit (PDU) session.

3. The method of claim 1, wherein the application descriptors are application descriptors defined by a Traffic descriptor in $3^{rd}$ generation partnership project (3GPP) protocol.

4. The method of claim 1, wherein the application descriptors comprise an operating system identifier (OSId) and an operating system application identifier (OSAppId).

5. The method of claim 1, wherein before performing network connection, the method further comprises:
   receiving the first application, wherein the first application contains the signing certificate of the first application.

6. The method of claim 1, wherein the digital fingerprint of the signing certificate of the first application is a string encrypted by a one-way encryption algorithm.

7. The method of claim 1, further comprising:
receiving the application descriptors in the URSP rule distributed by an operator server.

8. The method of claim 1, wherein matching the signing certificate of the first application or the digital fingerprint of the signing certificate with the application descriptors in the URSP rule distributed by the network side comprises:
determining that the signing certificate of the first application or the digital fingerprint of the signing certificate matches the application descriptors, on condition that the signing certificate of the first application or the digital fingerprint of the signing certificate is consistent with the application descriptors; or
determining that the signing certificate of the first application or the digital fingerprint of the signing certificate fails to match the application descriptors, on condition that the signing certificate of the first application or the digital fingerprint of the signing certificate is different from the application descriptors.

9. A non-transitory computer-readable storage medium storing computer programs which cause a computer to:
acquire a signing certificate of a first application or a digital fingerprint of the signing certificate, when performing network connection;
match the signing certificate of the first application or the digital fingerprint of the signing certificate with application descriptors in a UE route selection policy (URSP) rule distributed by a network side; and
create a session for the first application; wherein the first application contains a signing certificate of a developer, the application descriptors in the URSP rule comprise a network signing certificate of the first application or a digital fingerprint of the network signing certificate that is comprised in a network signature of the first application, and the network signature of the first application is obtained by re-signing by the network side the first application.

10. The non-transitory computer-readable storage medium of claim 9, wherein the computer programs further cause the computer to:
receive the first application before performing network connection, wherein the first application contains the signing certificate of the first application.

11. The non-transitory computer-readable storage medium of claim 9, wherein the computer programs further cause the computer to:
receive the application descriptors in the URSP rule distributed by an operator server.

12. The non-transitory computer-readable storage medium of claim 9, wherein the computer programs causing the computer to match the signing certificate of the first application or the digital fingerprint of the signing certificate with the application descriptors in the URSP rule distributed by the network side cause the computer to:
determine that the signing certificate of the first application or the digital fingerprint of the signing certificate matches the application descriptors, on condition that the signing certificate of the first application or the digital fingerprint of the signing certificate is consistent with the application descriptors; or
determine that the signing certificate of the first application or the digital fingerprint of the signing certificate fails to match the application descriptors, on condition that the signing certificate of the first application or the digital fingerprint of the signing certificate is different from the application descriptors.

13. A user equipment (UE), comprising:
a transceiver;
a processor, coupled with the transceiver; and
a memory, coupled with the transceiver and the processor, and storing program codes which are operable with the processor to:
cause the transceiver to acquire a signing certificate of a first application or a digital fingerprint of the signing certificate, when the UE performs network connection;
match the signing certificate of the first application or the digital fingerprint of the signing certificate with application descriptors in a UE route selection policy (URSP) rule distributed by a network side; and
create a session for the first application; wherein the first application contains a signing certificate of a developer, the application descriptors in the URSP rule comprise a network signing certificate of the first application or a digital fingerprint of the network signing certificate that is comprised in a network signature of the first application, and the network signature of the first application is obtained by re-signing by the network side the first application.

14. The UE of claim 13, wherein the session is a protocol data unit (PDU) session.

15. The UE of claim 13, wherein the application descriptors are application descriptors defined by a Traffic descriptor in $3^{rd}$ generation partnership project (3GPP) protocol.

16. The UE of claim 13, wherein the application descriptors comprise an operating system identifier (OSId) and an operating system application identifier (OSAppId).

17. The UE of claim 13, wherein the processor is further configured to:
receive, with the transceiver, the first application before the UE performs network connection, wherein the first application contains the signing certificate of the first application.

18. The UE of claim 13, wherein the digital fingerprint of the signing certificate of the first application is a string encrypted by a one-way encryption algorithm.

19. The UE of claim 13, wherein the processor is further configured to:
receive, with the transceiver, the application descriptors in the URSP rule distributed by an operator server.

20. The UE of claim 13, wherein the processor configured to match the signing certificate of the first application or the digital fingerprint of the signing certificate with the application descriptors in the URSP rule distributed by the network side is configured to:
determine that the signing certificate of the first application or the digital fingerprint of the signing certificate matches the application descriptors, on condition that the signing certificate of the first application or the digital fingerprint of the signing certificate is consistent with the application descriptors; or
determine that the signing certificate of the first application or the digital fingerprint of the signing certificate fails to match the application descriptors, on condition that the signing certificate of the first application or the digital fingerprint of the signing certificate is different from the application descriptors.

* * * * *